United States Patent Office.

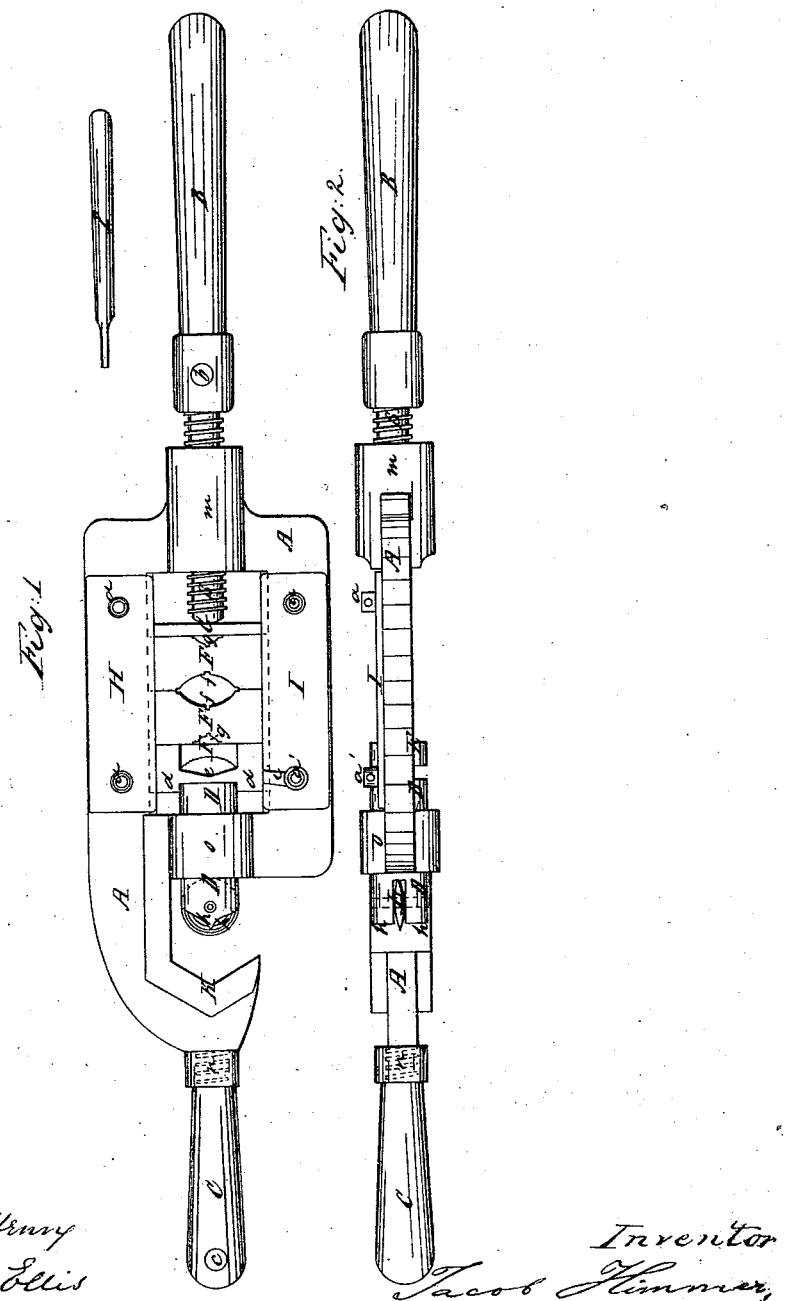

JACOB HIMMER, OF HARTFORD, CONNECTICUT.

Letters Patent No. 82,620, dated September 29, 1868.

IMPROVED TOOL FOR GAS-FITTERS.

*The Schedule referred to in these Letters Patent and making part of the same.*

TO ALL WHOM IT MAY CONCERN:

Be it known that I, JACOB HIMMER, of Hartford, in the county of Hartford, and State of Connecticut, have invented a new and useful Combination-Tool for Gas-Fitters; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1 shows a flat or side view of the improved tool.

Figure 2 shows an edge view of the same.

My invention consists in combining together, in one tool, a cutter for cutting off the ends of metal pipes, a scraper or file for cleaning the surface, preparatory to forming a screw, dies for cutting the thread, and a cramp for holding the pipe, to turn it; also in arranging the frame or stock so that it will serve the above purposes.

A is the frame or stock, containing the several parts of the tool.

B is a handle, having a screw, S, which passes through an enlarged part of the stock at $m$ to operate the several parts of the tool. It is furnished with a hole, $b$, for the introduction of a pin, P, for turning up the screw more tightly than can be done by the handle.

C is a removable handle, attached to the frame by means of a screw passing into the part $n$.

This handle is attached to the frame when the tool is used for cutting a screw-thread on a pipe, but is removed for the other operations described. It also has a hole, $c$, for setting it up tight by a pin, P.

D is a cylindrical plug, carrying the cutter-wheel L.

This plug fits and works in an opening through the enlarged part of the frame $o$, and is operated by the screw S to press it outward toward the angular jaw K.

The jaw is made with inclined sides, as shown in the drawings, so as to hold a pipe of any size firmly while being cut.

The cutter L is fastened in the end of D by means of the axis $l$, which can be removed by driving out with a pin, for the purpose of removing the wheel.

The part D has a cross-piece, $d$, for guiding its upper end.

E is a block, furnished with a concave scraper or file, to remove the crust or corroded part from a pipe preparatory to cutting a screw-thread upon it.

The cross-piece $d$ has upon its side next the scraper E, a recess, $e$, with inclined sides for the pipe to turn in while being scraped.

F F are the two parts of a die for cutting a screw-thread upon the end of a pipe. The pieces are made reversible, and have upon opposite sides different threads for different sizes of pipe, as shown at $ff$ and $gg$.

There may be as many as desired of these dies, six being the ordinary number required for the usual sizes of pipe.

G is a piece interposed between the end of the screw S and the dies, to prevent the point of the screw coming in contact with the thread of the die, and injuring it.

The parts $d$, E, F, and G slide back and forth along the sides of the frame, so that they can be placed in any desired position for use, and are secured in the stock, and prevented from coming out, by sliding in a groove, formed on one side by dove-tailing the sides of the frame, and on the other by the pieces H and I, which are screwed to the frame by the screws $a'$ $a$ $a$ $a$.

I has a part, $i$, cut away, to allow of its being turned to one side when it is desired to remove or replace any of the parts.

The head of the screw $a'$ is furnished with holes, so that it can be turned by means of the pin P.

The operation of my invention is as follows:

When it is desired to cut off a pipe, the handle C is removed, and the pipe inserted between the jaw K and the cutter L. The handle B is screwed firmly in, and acts, through the parts G, F, E, $d$, and D, upon the cutter to press it into the metal of the pipe. The tool is then turned round, rolling the cutter, L, around the circumference of the pipe. The screw S is kept turned forcibly up, by means of the pin P inserted in the hole $b$, and soon cuts off the pipe.

When it is desired to take hold of and turn a pipe, the wheel L is removed, and the edge $h$ forced against the pipe by means of the screw S, which holds it while being turned.

When it is desired to scrape off the scale from a pipe, the part $d$ is placed against the end, $o$, of the frame, and the pipe inserted between the parts E and $e$. The screw S is then turned up tight, and the tool revolved, when the file-surface upon E takes off the scale or corrosion.

To cut a screw-thread on a pipe, the handle C is screwed into its place, and the proper dies placed in the stock, by loosening the capstan-headed screw $a'$, with the pin P, and turning aside the piece I. After inserting the dies, the piece I is turned back to its place, and the screw tightened again. The lower die and the parts $d$ and E are placed against each other, and the end of the frame $o$, and the upper die and piece G, against the end of the screw S. The pipe is placed between the dies, and the screw cut in the ordinary manner.

*Claim.*

What I claim as my invention, and desire to secure by Letters Patent, is—

An improved combination-tool, constructed and arranged substantially as described.

JACOB HIMMER.

Witnesses:
 FRAS. AUG. HENRY,
 THEO. G. ELLIS.